United States Patent Office 3,037,036
Patented May 29, 1962

---

3,037,036
ALKANOYL DERIVATIVES OF OXAMIDE
William L. Fierce, Crystal Lake, Walter J. Sandner, Carpentersville, and Roger L. Weichman, Grayslake, Ill., assignors to The Pure Oil Company, Chicago, Ill., a corporation of Ohio
No Drawing. Filed Apr. 28, 1960, Ser. No. 25,213
11 Claims. (Cl. 260—404.5)

This invention relates to new and useful nitrogen-containing compounds and the process of preparing the same. In particular, this invention relates to certain novel derivatives of oxamide and to a method of preparing such compounds.

Oxamide and derivatives thereof are known compounds which are useful as chemical intermediates and also as sources of organic nitrogen for use as fertilizers. This invention is concerned with the preparation of certain novel derivatives of oxamide which are previously unreported in the literature and which may be prepared by a simple process involving the reaction of cyanogen and carboxylic acids.

One object of this invention is to provide a new improved class of nitrogen-containing compounds.

Another object of this invention is to provide an improved process for the preparation of oxamide derivatives from cyanogen.

A feature of this invention is the provision of a novel class of compounds, acyl derivatives of oxamide.

Another feature of this invention is the provision of a novel process for the preparation of reaction products, probably acyl derivatives of oxamide, by reaction of a carboxylic acid with cyanogen in the presence of cyanide ions under anhydrous conditions.

Other objects and features of this invention will become apparent from time to time throughout the specification and claims as hereinafter related.

In accordance with this invention, we have found that organic carboxylic acids will react with cyanogen under anhydrous conditions in the presence of cyanide ions to produce reaction products which are probably acyl derivatives of oxamide. When a $C_2$–$C_{12}$ carboxylic acid, such as acetic acid, propionic acid, butyric acid, lauric acid, etc., and cyanogen are sealed in a suitable container in the presence of a cyanide salt (or other cyanide compound capable of yielding cyanide ions) under anhydrous conditions, a slow reaction takes place in which there is formed a novel reaction product which is probably a diacyl derivative of oxamide of the formula,

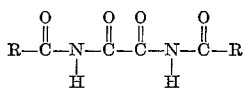

where R is a hydrocarbyl radical, or a mixture of mono- and di-acyl derivatives. In carrying out this reaction, it is essential that anhydrous conditions be used since the presence of water during the reaction causes the product to be converted into oxamide. The reaction with water to convert the reaction product into oxamide is very slow and the acetyl and other lower acyl derivatives, may be purified by water-washing and recrystallization from water without undergoing extensive hydrolysis. These compounds are useful as chemical intermediates in the preparation of other derivatives of oxamide and may be used as fertilizers since the compounds decompose very slowly to make available nitrogen over an extended period of time. In particular, these reaction products may be used as fertilizers in alkaline soils since organic acids are by-products of the decomposition of these compounds.

In carrying out the reaction of the carboxylic acid with cyanogen, the acid and cyanogen are preferably sealed in a gas-tight container due to the high toxicity of cyanogen. The acid and cyanogen are sealed in a suitable gas-tight container together with a cyanide salt of the group consisting of alkaline metal cyanides, alkaline earth metal cyanides and cyanide salts of nitrogen bases, such as ammonium cyanide, guanidinium cyanide, etc. The reaction may be carried out in the absence of solvent where the acid reactant is a liquid, as in the case of acetic acid. If the acid reactant is solid, then the reaction may be carried out in any inert, non-aqueous solvent. Solvents which may be used include hydrocarbons, such as hexane, benzene, toluene, etc., and other inert organic solvents, such as ethers, chlorinated hydrocarbons, etc. The reaction may be carried out at temperatures as low as 0° or as high as 100° C., although lower or higher temperatures may be used if desired.

The following non-limiting examples are illustrative of the scope of this invention.

*Example I*

In one experiment, a glass vial was charged with 12.5 g. of cyanogen, 50 cc. glacial acetic acid, 25 cc. benzene, and 2 g. sodium cyanide. The vial was sealed and held at room temperature, with occasional agitation. After 30 days, the vial contained a yellow-brown liquid and a yellow solid. The mixture was filtered to recover the yellow solid in the amount of 26.2 g. This solid was washed thoroughly with water (which caused a 65.9% loss in weight), and subsequently recrystallized twice from aqueous solution. The product which was obtained was analyzed by infra-red spectroscopy and N—H and C=O functional groups identified, which indicated that the product was an acetyl derivative of oxamide. Infra-red analysis also indicated the absence of oxamide or any compounds containing nitrile functional groups.

*Example II*

In another experiment, a flask fitted with a stirrer and a condenser was charged with 100 cc. glacial acetic acid, 50 cc. benzene, and 4 g. sodium cyanide. The mixture was stirred while a gaseous mixture of cyanogen (50 cc./min.) and helium (50 cc./min.) was bubbled in. After about 1 hour at room temperature, the solution was heated to about 80° C. and the bubbling was continued for 75 minutes. No solid product formed at the end of this period. The flask was then stoppered and allowed to stand at room temperature for about 3 months. During this period, a pink solid formed which was recovered and found to weigh about 3.5 g. Infra-red analysis of this product indicated that the solid contained about 13% oxamide and a predominant amount of a material having the same infra-red spectrum as that of the product produced in Example I.

*Example III*

In another series of experiments, five glass vials were charged as follows:

| Vial Number | 1 | 2 | 3 | 4 | 5 |
|---|---|---|---|---|---|
| cc. Glacial Acetic Acid | 50 | 50 | 50 | 50 | 100 |
| cc. Benzene | 25 | | 25 | 25 | 50 |
| g. NaCN | 2 | 2 | 2 | | 4 |
| g. Cyanogen | 12.25 | 10.23 | | 10.68 | 19.80 |

The vials were sealed and allowed to stand at room temperature for about six weeks with occasional agitation. At this time, solid products were present in vials 1, 2, and 5. The solid from vial 2 was filtered, water-washed, and dried, as in Example I. The product had a melting point of 183°–193° C. and had an infra-red spectrum substantially the same as that of the product formed in Example I.

When other $C_2$–$C_{12}$ aliphatic acids (which can be saturated or unsaturated, straight-chain, or branched) are mixed with cyanogen and a cyanide salt and kept at ambient temperature for about four weeks, solid derivatives are formed which are similar to those produced in the foregoing examples. Thus, the substitution of propionic acid, butyric acid, capric acid, lauric acid, crotonic acid, vinylacetic acid, isovaleric acid, etc., for acetic acid and in the processes of Examples I, II, or III produces solid reaction products of analogous chemical structure. The reaction products (probably diacyl derivatives of oxamide) which are produced in accordance with the above experiments are useful as intermediates in the preparation of other derivatives of oxamide. Additionally, these compounds may be used as sources of oxamide and the acid reactant by slow hydrolysis. Since these compounds may be hydrolyzed slowly over an extended period of time to yield oxamide and organic acids, these compounds are useful as fertilizers either alone or in combination with other materials.

While we have described our invention fully and completely as required by the patent laws, with reference to several specific embodiments thereof, we wish it understood that within the scope of the appended claims, this invention may be practiced otherwise than as specifically described herein.

The embodiments of the invention in which an exclusive property or privilege is claimed are defined as follows:

1. A method of preparing acyl derivatives of oxamide which comprises reacting cyanogen with a $C_2$–$C_{12}$ aliphatic hydrocarbon carboxylic acid at a temperature of 0°–100° C., in a liquid reaction medium selected from the group consisting of said $C_2$–$C_{12}$ aliphatic acid and inert non-aqueous solvents in the presence of cyanide ions under anhydrous conditions.

2. A method according to claim 1 in which the reaction is carried out in a lower aliphatic acid as solvent and reactant.

3. A method according to claim 1 in which the reaction is carried out in an inert non-aqueous solvent.

4. A method according to claim 1 in which the reaction is carried out in the presence of a cyanide salt selected from the group consisting of alkali metal cyanides, alkaline earth metal cyanides, and ammonium cyanide.

5. A method according to claim 1 in which the acid used is butyric acid.

6. A method according to claim 1 in which the acid used is lauric acid.

7. A method of preparing an acetyl derivative of oxamide which comprises reacting acetic acid with cyanogen in admixture with sodium cyanide at a temperature of 0°–100° C., in the absence of solvents.

8. The reaction product of claim 1.
9. The reaction product of claim 5.
10. The reaction product of claim 6.
11. A reaction product produced in accordance with claim 7, consisting of a crystalline solid having a melting point of about 183°–193° C., and having an infra-red spectrum evidencing the presence of C=O and NH groups.

References Cited in the file of this patent

Degering: An Outline of Organic Nitrogen Compounds, published by University Lithoprinters (Ypsilanti, Mich.), p. 506 (1950).